UNITED STATES PATENT OFFICE.

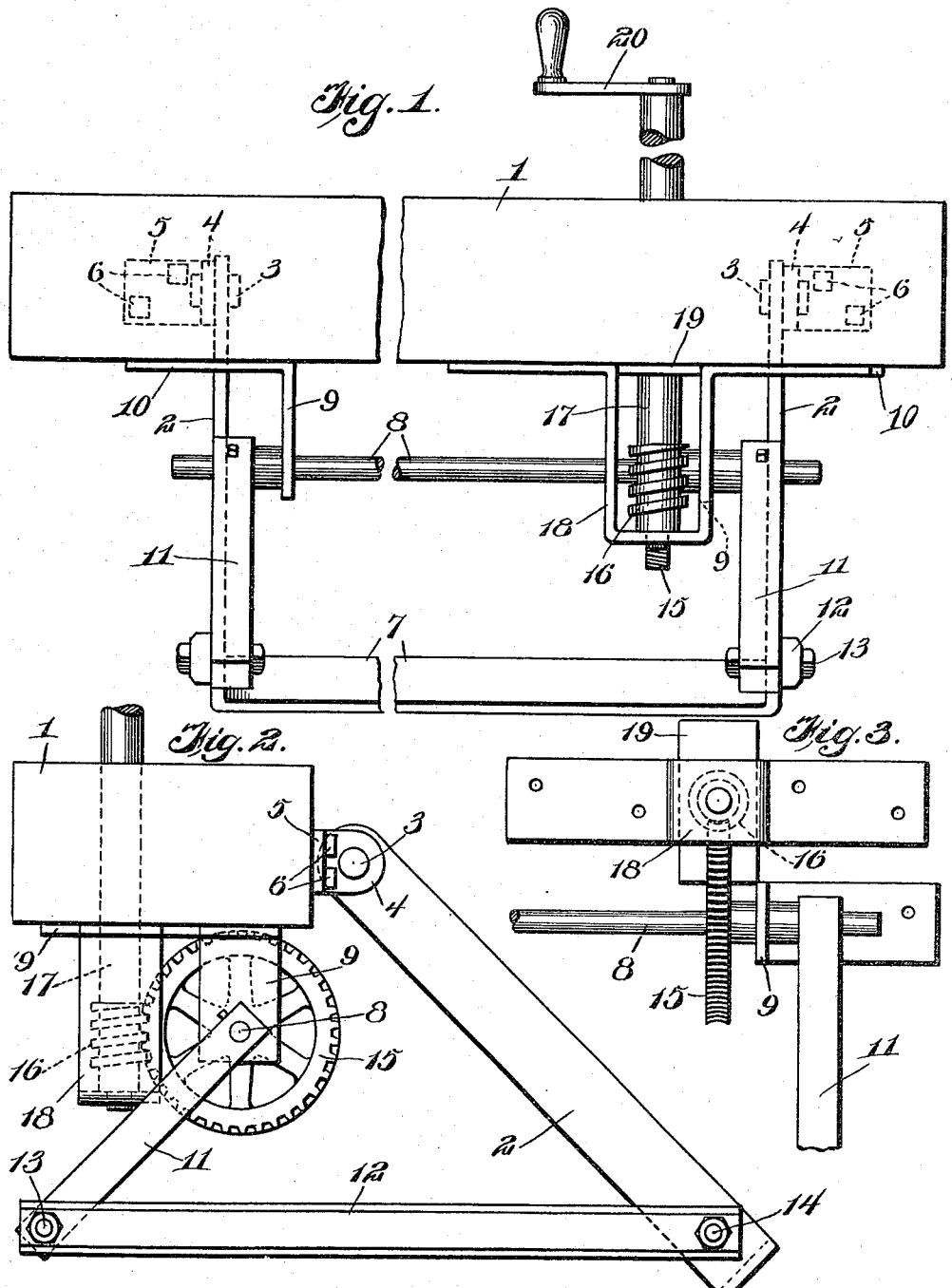

JOSHUA F. GUYN, OF THOROFARE, NEW JERSEY.

CAR-FENDER.

1,178,151. Specification of Letters Patent. Patented Apr. 4, 1916.

Application filed October 9, 1915. Serial No. 55,020.

*To all whom it may concern:*

Be it known that I, JOSHUA F. GUYN, a citizen of the United States, residing at Thorofare, in the county of Gloucester and State of New Jersey, have invented new and useful Improvements in Car-Fenders, of which the following is a specification.

This invention relates to car fenders and the particular object in view is to provide in connection with a fender frame having a hinged relation to the car or truck frame, means controlled by the driver for readily raising and lowering the fender and also locking the same at any desired elevation, the controlling means being located conveniently to the driver.

In suburban traffic, on account of the varying condition of the roadway, it is sometimes necessary to carry a car fender in a higher position than at other points along the roadway on account of the nature of the roadway and this is also true in different portions of a city or town, it being desirable of course to have the bottom edge of the fender positioned as low as possible in order to adapt it the more readily to pick up persons and objects and prevent the same from getting beneath the wheels, axles and other parts of the truck.

With the above and other objects in view, the invention consists in the novel construction, combination and arrangement of parts, as herein described, illustrated and claimed.

In the accompanying drawings:—Figure 1 is a rear elevation of a car fender embodying the present invention, showing the end sill of a car also in elevation. Fig. 2 is a side elevation of the same. Fig. 3 is a fragmentary bottom plan view showing a portion of the fender-adjusting mechanism.

Referring to the drawings 1 designates the end sill of a car truck frame, and 2 the fender frame which has a hinged relation to the sill 1, being pivotally connected therewith by means of pins or bolts 3 carried by fender supporting brackets 4 shown as provided with base portions 5 which are bolted or otherwise fastened to the sill 1 as indicated at 6.

The fender frame 2 is shown in Fig. 1 as comprising the substantially parallel side bars and the connecting cross bar 7 but the shape of this frame will, of course, be varied to suit the desire of the manufacturer.

The means for raising and lowering the fender frame 2 and sustaining or locking the same at any desired adjustment embodies a crank shaft 8 substantially parallel to the axis of movement of the fender frame 2, the shaft 8 being journaled in hangers 9 having angular base portions 10 which are fastened to the under side of the sill 1. The shaft 8 is provided with crank arms 11 fast thereon and arranged in spaced relation to each other and the arms 11 are connected with the fender frame 2 by means of braces 12 forming also links which are pivotally connected at 13 to the extremities of the arms 11 and pivotally connected at 14 to the fender frame 2.

The shaft 8 has fast thereon a worm wheel 15 which meshes with and is actuated by a worm 16 on a manually operable worm shaft 17. The last named shaft has its lower end reduced in diameter and journaled in a pendent stirrup 18 fastened to the under side of the car sill, said shaft also passing through and having a bearing in a plate 19 fastened to the bottom face of said sill. The shaft 17 extends upwardly through and above the sill 1 and the floor or platform of the car and is provided at its upper end with an operating handle 20. Braces or links 12 are indicated in Fig. 2 as composed of channel iron but it will of course be understood that they may be of any desired shape in cross section.

The driver of the car without moving from his position may by means of the handle 20 revolve the shaft 17 causing the worm 16 to turn the worm wheel 15 and the shaft 8. By turning the shaft 17 in one direction, the fender frame may be raised to any desired extent and by turning said shaft 17 in the opposite direction, the fender frame 2 may be lowered. The fender frame will remain wherever it is left and will be securely locked in such position by reason of the fact that it is impossible for the worm wheel 15 to revolve the shaft 17 by reason of its engagement with the worm 16. In other words, the worm 16 may turn the wheel 15 but the wheel 15 may not turn the worm 16. This enables the driver of the car to adjust the fender frame in accordance with varying conditions of the roadbed and other conditions such as the number of passengers carried by the car, it being evident that the height of the truck frame will vary in accordance with the load imposed thereon and the bottom edge of the fender will be correspondingly affected.

By the mechanism above described the fender is under the complete control of the driver who may readily and quickly adjust the same without leaving his driving position. Furthermore, the fender frame is thoroughly braced by the members 12 in conjunction with the arms 11 of the crank shaft 8 which is positively held against turning by the interlock existing between the wheel 15 and the worm 16.

Having thus described my invention, I claim:—

1. The combination with a car frame, of a fender frame having a hinged connection therewith, and fender raising and lowering and locking means comprising a crank shaft, crank arms thereon in spaced relation to each other, braces pivotally connected at one end to said arms and at the other end to the fender frame, a worm wheel fast on said crank shaft, a manually operable upright shaft, and a worm on the last named shaft engaging the worm wheel on the crank shaft.

2. The combination with a car frame, of a fender frame having a hinged connection therewith, and fender raising, lowering and locking means, comprising a crank shaft parallel to the axis of movement of the fender frame, crank arms thereon in spaced relation to each other, braces pivotally connected at one end to said arms and at the other end to the fender frame, a worm wheel fast on said crank shaft, a manually operable upright shaft, and a worm on the last named shaft engaging the worm wheel on the crank shaft.

In testimony whereof I affix my signature in presence of two witnesses.

JOSHUA F. GUYN.

Witnesses:
BESSIE D. SHARP,
FRANCIS B. DAVIS.

Copies of this patent may be obtained for five cents each, by addressing the "Commissioner of Patents, Washington, D. C."